US008904758B2

(12) United States Patent
Ikeda et al.

(10) Patent No.: US 8,904,758 B2
(45) Date of Patent: Dec. 9, 2014

(54) INTERNAL COMBUSTION ENGINE SYSTEM AND METHOD FOR CONTROLLING INTERNAL COMBUSTION ENGINE SYSTEM

(71) Applicant: Aisan Kogyo Kabushiki Kaisha, Obu-shi, Aichi (JP)

(72) Inventors: Shinji Ikeda, Nisshin (JP); Masaki Ikeya, Obu (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 93 days.

(21) Appl. No.: 13/672,146

(22) Filed: Nov. 8, 2012

(65) Prior Publication Data

US 2013/0125528 A1    May 23, 2013

(30) Foreign Application Priority Data

Nov. 18, 2011   (JP) ................. 2011-253038

(51) Int. Cl.
*F01N 3/10* (2006.01)
*B60K 13/04* (2006.01)
*F01N 13/00* (2010.01)
*B60K 15/035* (2006.01)

(52) U.S. Cl.
CPC ............... *F01N 13/002* (2013.01); *F01N 3/10* (2013.01); *F01N 13/00* (2013.01); *B60K 13/04* (2013.01); *B60K 2015/03514* (2013.01); *B60K 15/03504* (2013.01)
USPC ............................................. 60/281; 60/283

(58) Field of Classification Search
CPC ........ B60K 15/04; B60K 15/07; B60K 13/04; B64D 37/32; F01N 2610/10; F01N 2610/142; F01N 2610/1406; F02D 2700/04
USPC ..................................................... 60/281, 283
See application file for complete search history.

(56) References Cited

U.S. PATENT DOCUMENTS

| 5,524,433 A * | 6/1996 | Adamczyk et al. ............. 60/276 |
| 2009/0120064 A1 * | 5/2009 | Uhrich et al. ................... 60/278 |

FOREIGN PATENT DOCUMENTS

| JP | A-9-193674 | 7/1997 |
| JP | A-2008-286033 | 11/2008 |
| JP | A-2009-133279 | 6/2009 |

* cited by examiner

*Primary Examiner* — Kenneth Bomberg
*Assistant Examiner* — Jonathan Matthias
(74) *Attorney, Agent, or Firm* — Oliff PLC

(57) ABSTRACT

An internal combustion engine system having a fuel tank for storing fuel to be supplied to an engine and an exhaust passage in which exhaust gas is to be exhausted from the engine, wherein the internal combustion engine system includes: a closing member to close the exhaust passage; an exhaust gas introduction passage connecting the exhaust passage and the fuel tank; and a controller configured to close the exhaust passage by the closing member after the engine is stopped to store the exhaust gas in the exhaust passage and to introduce the exhaust gas stored in the exhaust passage into the fuel tank via the exhaust gas introduction passage.

7 Claims, 4 Drawing Sheets

INTERNAL COMBUSTION ENGINE SYSTEM AND METHOD FOR CONTROLLING INTERNAL COMBUSTION ENGINE SYSTEM

CROSS-REFERENCE TO RELATED APPLICATIONS

This application is based upon and claims the benefit of priority from the prior Japanese Patent Application No. 2011-253038 filed on Nov. 18, 2011, the entire contents of which are incorporated herein by reference.

BACKGROUND OF THE INVENTION

1. Field of the Invention

The present invention relates to an internal combustion engine system including a fuel tank, an engine, a muffler, and others and relates to a method for controlling the internal combustion engine system.

2. Related Art

An HV (hybrid vehicle) and a PHV (plug-in hybrid vehicle) consuming less fuel are slow in the fuel consumption pace, and therefore there is a possibility that the fuel is stored in a fuel tank for a long period and thus deteriorates (oxidizes). Particularly, fuel (gasoline) including alcohol is apt to deteriorate rapidly. Deterioration of the fuel could cause deterioration of resin-made components and rubber-made components which are in contact with the fuel and cause corrosion of metal parts being in contact with the fuel. Further, there are concerns that oxidation products due to corrosion of the metal parts could adhere to an electrode and a contact to cause faulty electrical continuity and that the oxidation products could clog a filter.

In response to the above problem, a first conventional art provides a technique that inert gas such as nitrogen gas is filled in a fuel tank from an external high-pressure nitrogen cylinder. However, this technique requires an extra facility for periodically refilling the nitrogen gas in the high-pressure nitrogen gas cylinder, leading to a cost increase. Further, a vehicle requires an extra space for mounting the high-pressure nitrogen cylinder. Mounting the high-pressure nitrogen cylinder on the vehicle also leads to a problem of vehicle safety.

As a second conventional technique, the exhaust gas discharged from an engine is cooled by a cooler and temporarily stored in a reservoir, and after that, the exhaust gas is filled in a fuel tank from the reservoir by a pump. However, this technique requires various components such as the cooler, the reservoir, and the pump, leading to a cost increase. Further, a vehicle needs to have a mounting space for these components, which could cause restrictions on a vehicle design.

Herein, Patent Document 1 discloses a system for preventing oxidation of fuel by introducing exhaust gas to a fuel tank.

RELATED ART DOCUMENTS

Patent Documents

Patent Document 1: JP09 (1997)-193674A

SUMMARY OF INVENTION

Problems to be Solved by the Invention

In the system disclosed in Patent Document 1, the exhaust gas is introduced in the fuel tank while the engine is driven, and the exhaust gas at high temperature is introduced in the fuel tank. However, it is not preferable that such hot exhaust gas is introduced in the fuel tank since occurrence of vapor (evaporated fuel) in the fuel tank is promoted. For preventing the vapor from occurring in the fuel tank, a cooling device for cooling the hot exhaust gas is required. This increases costs and needs an installation space.

The present invention has been made to solve the above problems and has a purpose to provide an internal combustion engine system and a method for controlling the same for preventing deterioration of fuel inside a fuel tank as well as decreasing the cost.

Means of Solving the Problems

To achieve the above purpose, one aspect of the invention provides an internal combustion engine system having a fuel tank for storing fuel to be supplied to an engine and an exhaust passage in which exhaust gas is to be exhausted from the engine, wherein the internal combustion engine system includes: a closing member to close the exhaust passage; an exhaust gas introduction passage connecting the exhaust passage and the fuel tank; and a controller configured to close the exhaust passage by the closing member after the engine is stopped to store the exhaust gas in the exhaust passage and to introduce the exhaust gas stored in the exhaust passage into the fuel tank via the exhaust gas introduction passage.

According to this aspect, the controller controls the closing member to close the exhaust passage after the engine is stopped to store the exhaust gas in the exhaust passage, and then introduce the exhaust gas stored in the exhaust passage into the fuel tank via the exhaust gas introduction passage. In this manner, the exhaust gas with low oxygen concentration is introduced in the fuel tank, and thereby, progress of deterioration (oxidation) of the fuel is restrained even if the fuel is stored in the fuel tank for a long period. Further, since the exhaust gas stored in the exhaust passage is introduced in the fuel tank, it is not necessary to provide an extra tank or others for storing the exhaust gas. Furthermore, since the exhaust gas is cooled down in the exhaust passage, there is no need to provide a device for cooling the exhaust gas. Accordingly, deterioration of the fuel in the fuel tank is prevented while achieving cost reduction.

Another aspect of the present invention to solve the above problem is a method for controlling an internal combustion engine system, the engine system including a fuel tank for storing fuel to be supplied to an engine and an exhaust passage to which exhaust gas is exhausted from the engine, wherein the internal combustion engine system includes a closing member to close the exhaust passage and an exhaust gas introduction passage connecting the exhaust passage and the fuel tank, and the closing member closes the exhaust passage to store the exhaust gas in the exhaust passage after the engine is stopped and then the exhaust gas stored in the exhaust passage is introduced into the fuel tank via the exhaust gas introduction passage.

According to this aspect, the closing member is controlled to store the exhaust gas in the exhaust passage after the engine is stopped, and then introduce the exhaust gas stored in the exhaust passage into the fuel tank via the exhaust gas introduction passage. In this manner, the exhaust gas with low oxygen concentration is introduced in the fuel tank, and thereby deterioration (oxidation) of the fuel can be restricted even if the fuel is stored in the tank for a long period. Further, the exhaust gas stored in the exhaust passage is introduced in the fuel tank, thus eliminating the need for providing an extra tank and others for storing the exhaust gas. Also, since the exhaust gas is cooled down in the exhaust passage, there is no need to provide a device for cooling the exhaust gas. Accordingly, deterioration of the fuel in the fuel tank can be restrained while achieving cost reduction.

Effects of the Invention

According to an internal combustion engine system and a method for controlling the same, deterioration of fuel in a fuel tank can be restrained while achieving cost reduction.

DESCRIPTION OF EMBODIMENTS

A detailed description embodying the present invention will now be given referring to the accompanying drawings.

<Configuration of Internal Combustion Engine System>

Figure 1:
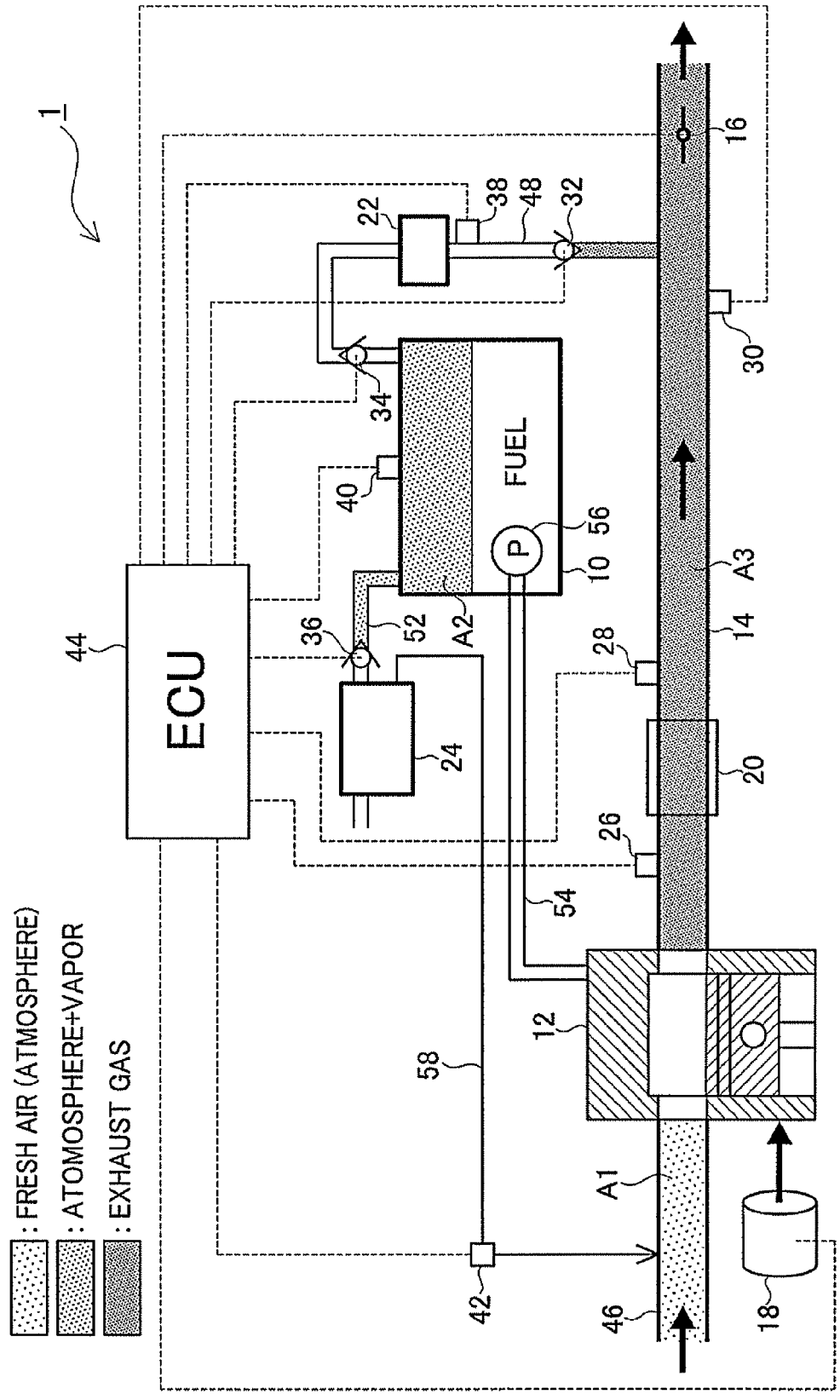
FIG. 1 is a diagram showing a configuration of an internal combustion engine system when an engine is operated.

A configuration of an internal combustion engine system (hereinafter, also simply referred to as an "engine system") 1 according to the present embodiment is firstly explained. FIG. 1 is a diagram showing a configuration of the engine system 1. As shown in FIG. 1, the engine system 1 includes: a fuel tank 10; an engine 12; a muffler 14; an exhaust shutter 16; an MG (motor generator) 18; a catalytic converter 20; an exhaust filter 22; a canister 24; a first $O_2$ sensor 26; a second $O_2$ sensor 28; an exhaust temperature sensor 30; a first check valve 32; a second check valve 34; a third check valve 36; a first pressure sensor 38; a second pressure sensor 40; a VSV 42; an ECU 44; and others. The engine system 1 further includes a passage 46; an exhaust gas introduction passage 48; a passage 52, and a fuel supply passage 54. A starter may be adopted instead of the MG 18, but the following explanation is made with exemplifying the MG 18.

The fuel tank 10 is a unit for storing fuel to be supplied to the engine 12. The fuel stored in the fuel tank 10 is supplied to the engine 12 by a pump 56 through the fuel supply passage 54. This passage 54 is provided with a fuel filter (not shown) for removing impurities from the fuel.

The muffler 14 is a passage through which the exhaust gas is discharged from the engine 12. The exhaust shutter 16 is provided downstream in an exhaust gas flow direction from a branching point of the muffler 14 from which the exhaust gas introduction passage 48 branches off. This exhaust shutter 16 opens and closes the muffler 14. The muffler 14 is one example of an "exhaust passage" in the present invention and the exhaust shutter 16 is one example of a "closing member" in the present invention.

The MG 18 is a motor generator mounted on an HV (hybrid vehicle) and a PHV (plug-in hybrid vehicle) and connected to the engine 12 for power transmission. The catalytic converter 20 is provided in the muffler 14. This catalytic converter 20 is formed internally with a catalyst to purify hazardous components in the exhaust gas by reduction and oxidation.

The exhaust filter 22 is provided in the exhaust gas introduction passage 48 which connects the fuel tank 10 and the muffler 14. This exhaust filter 22 is to remove carbon and/or fuel degradation components from the exhaust gas. The exhaust filter 22 preferably has a catalytic function in addition to a filtering function. The canister 24 is provided in the passage 52 connected to the fuel tank 10. This canister 24 includes an absorber for absorbing vapor (evaporated fuel).

The first and second $O_2$ sensors 26 and 28 are provided on the muffler 14 on opposite sides with respect to the catalytic converter 20. The exhaust temperature sensor 30 is provided downstream in the exhaust gas flow direction from the second $O_2$ sensor 28 on the muffler 14. This exhaust temperature sensor 30 is to detect a temperature of the exhaust gas.

The first check valve 32 is located in the exhaust gas introduction passage 48 which connects the muffler 14 and the fuel tank 10 and between the muffler 14 and the first pressure sensor 38. When this first check valve 32 is opened, the exhaust gas is allowed to flow from the muffler 14 to the exhaust filter 22 side. In order to reliably prevent introduction of the exhaust gas at high temperature in the fuel tank 10 by this first check valve 32, the first check valve 32 is preferably a solenoid valve. Further, since the first check valve 32 controls the flow of the exhaust gas from the muffler 14 toward the exhaust filter 22, clogging of the exhaust filter 22 is also prevented.

The second check valve 34 is formed between the exhaust filter 22 and the fuel tank 10 and in the exhaust gas introduction passage 48. When this second check valve 34 is opened, the exhaust gas having passed through the exhaust filter 22 is allowed to flow in the fuel tank 10. Further, the second check valve 34 prevents the vapor in the fuel tank 10 from flowing to the exhaust filter 22 side. The second check valve 34 also prevents the exhaust gas at high temperature from being introduced in the fuel tank 10 as similar to the above-mentioned first check valve 32.

The third check valve 36 is located in the passage 52. When this third check valve 36 is opened, atmosphere (air) and the vapor are allowed to flow in the canister 24 from the fuel tank 10.

The first pressure sensor 38 is provided on the exhaust gas introduction passage 48 between the first check valve 32 and the exhaust filter 22. The second pressure sensor 40 is provided on the fuel tank 10. This second pressure sensor 40 is to detect pressure of a vapor phase portion including atmosphere (air), vapor, and others in the fuel tank 10.

The VSV (Vacuum Switching Valve) 42 is an open-close valve and provided in the purge passage 58 which connects the canister 24 and the passage 46. This VSV 42 is opened to open the purge passage 58 when the engine 12 is operated. The passage 46 is a passage to supply the atmosphere to the engine 12.

The ECU 44 is a controller to conduct various control operations of the engine system 1. This ECU 44 includes: a CPU for conducting various arithmetic processing; a ROM storing control programs, data, and others required for the control operations; a memory comprising a RAM, a nonvolatile memory, and others for temporarily storing the processing results of the CPU; ports for inputting and outputting signals from and to outside; and others. To the ports of the ECU 44, the above-mentioned exhaust shutter 16, MG 18, first $O_2$ sensor 26, second $O_2$ sensor 28, exhaust temperature sensor 30, first check valve 32, second check valve 34, third check valve 36, first pressure sensor 38, second pressure sensor 40, VSV 42, and others are connected.

<Method for Controlling the Internal Combustion Engine System>

Figure 2:
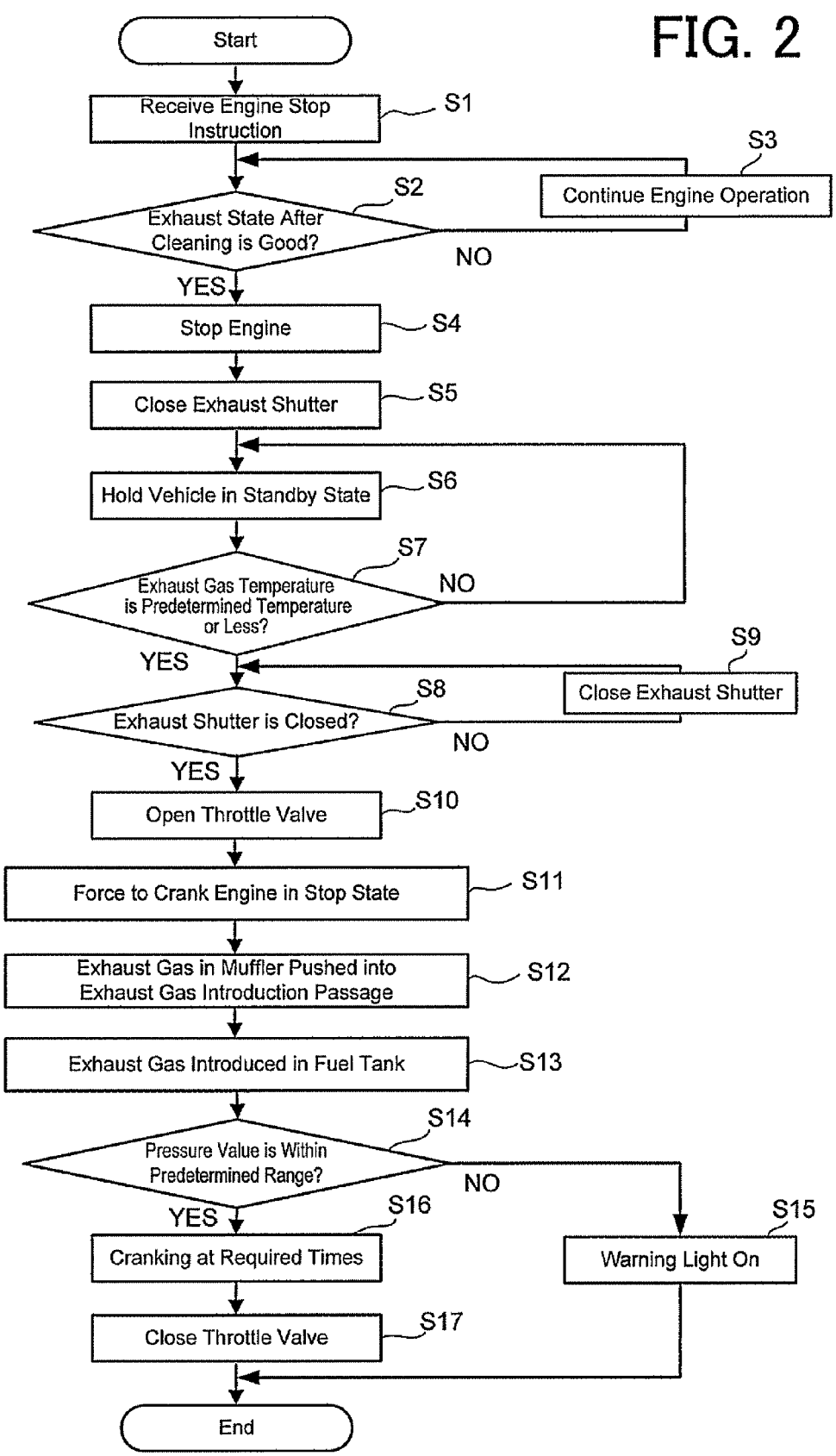
FIG. 2 is a flow chart showing a method for controlling the internal combustion engine system.

Next, as a controlling method of the internal combustion engine system 1 having the above-mentioned configuration, a controlling method for restricting deterioration of the fuel in the fuel tank 10 is explained. FIG. 2 is a flow chart showing the controlling method of the engine system 1. The controlling method of the engine system 1 as explained below is executed by use of the ECU 44.

As shown in FIG. 2, in response to an operation (typically, an off operation of an ignition key) by a driver, the ECU 44 receives an instruction or command to stop operation of the engine 12 (S1). Based on a detection result of an oxygen concentration in the muffler 14 detected by the second $O_2$ sensor 28, it is determined whether a state of the exhaust gas after cleaned up by the catalytic converter 20 is good (S2). Herein, "whether a state of the exhaust gas is good" means a determination whether the oxygen concentration of the exhaust gas is appropriate (whether the oxygen concentration is lower than a predetermined concentration) when the exhaust gas is introduced as inert gas in the fuel tank 10. If the state is not good, the engine 12 continues to be driven (S3), and then the flow goes back to S2. On the other hand, if the exhaust gas state is good, the engine 12 is stopped (S4).

Then, the engine is stopped at S4 and the exhaust shutter 16 in the muffler 14 is closed (S5). Thereby, the exhaust gas inside the muffler 14 is not discharged outside and is stored inside the muffler 14. In addition, since the first check valve 32 is closed at this time, the exhaust gas in the muffler 14 is not introduced in the fuel tank 10 and remains to be inside the muffler 14.

While the vehicle is held in a standby state (the engine 12 is maintained in the stop state), the exhaust gas stored in the muffler 14 is cooled down as time goes by (S6).

Based on the detected result of the temperature of the exhaust gas stored in the muffler 14 detected by the exhaust temperature sensor 30, it is determined whether the temperature of the exhaust gas stored in the muffler 14 is equal to or lower than a predetermined temperature (S7). Herein, the "predetermined temperature" is changeable under various conditions, and one example is 100° C. When the temperature of the exhaust gas is higher than the predetermined temperature, the flow goes back to S6. When the temperature is equal to or lower than the predetermined temperature, on the other hand, it is checked if the exhaust shutter 16 is surely closed (S8). If the exhaust shutter 16 is not closed, the exhaust shutter 16 is closed (S9), and the flow goes back to S8. If the exhaust shutter 16 is closed, a throttle valve (not shown) provided in the passage 46 is opened to a required degree (S10).

Then, the engine 12 is forced to crank by the MG 18 while the engine 12 remains to be in the stop state (without starting) (S11). Namely, while the engine 12 remains to be in the stop state, a crank shaft (not shown) of the engine 12 is forcibly rotated by the power generated by the MG 18. To be more specific, the crank shaft is forcibly rotated such that combustion of the fuel in a combustion chamber (not shown) of the engine 12 does not occur, so that the engine is operated to pump fresh air (atmosphere) and the fresh air is introduced in the muffler 14 instead of the exhaust gas. Specifically, fuel injection is not conducted, for example, such that the fuel combustion in the combustion chamber of the engine 12 does not occur. The crank shaft of the engine 12 may be rotated by rotation of a starter (not shown), instead of the MG 18.

Figure 3:
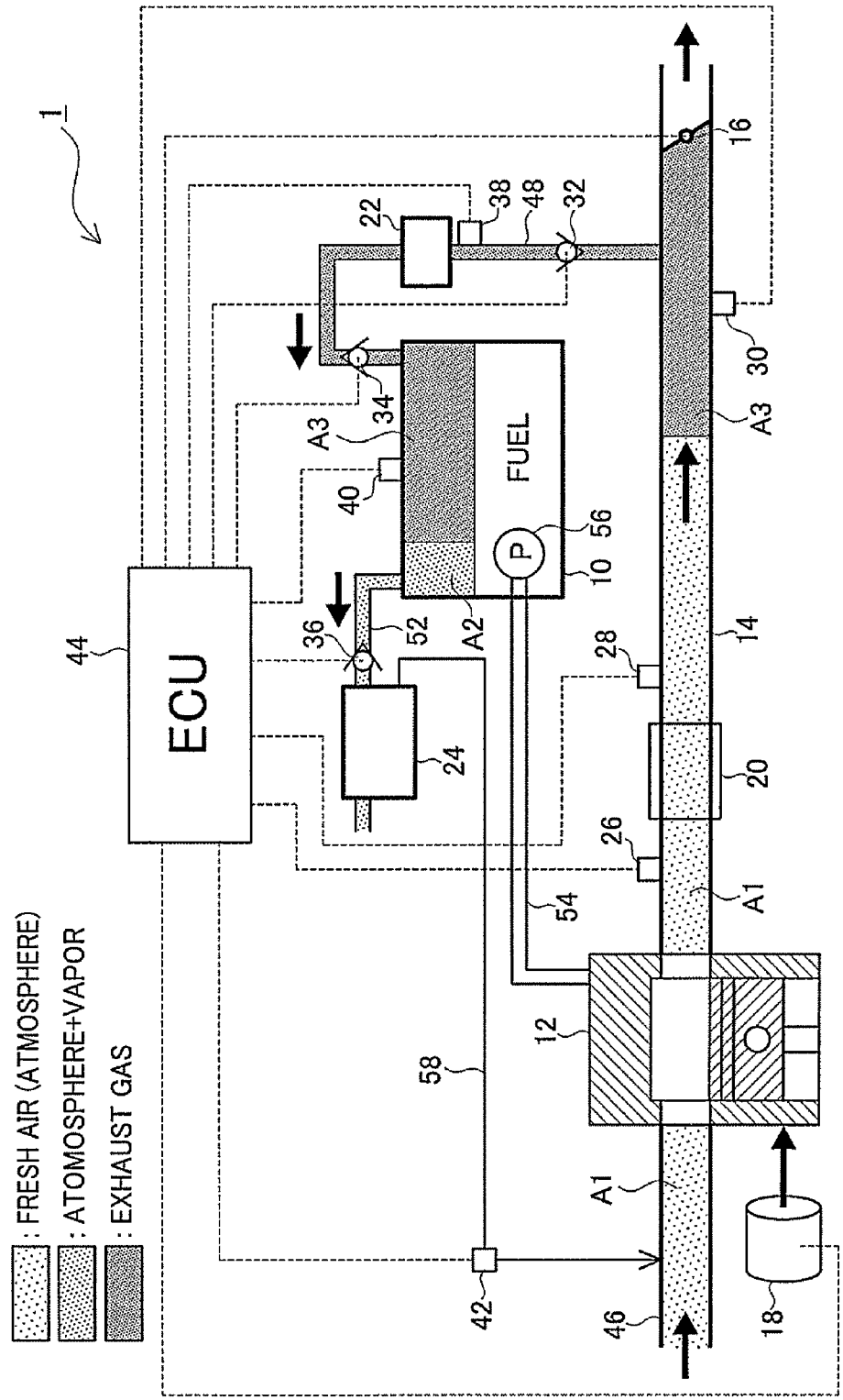
FIG. 3 is a diagram showing the internal combustion engine system after the engine is stopped.

Then, as shown in FIG. 3, the fresh air (atmosphere) is introduced in the muffler 14, and thereby the exhaust gas in the muffler 14 is pushed into the exhaust gas introduction passage 48 (S12). Thus, the exhaust gas is introduced in the fuel tank 10 via the exhaust gas introduction passage 48 and the exhaust filter 22 (S13). At this time, it is determined whether pressure values measured by the first and second pressure sensors 38 and 40 are within a predetermined range (S14). When the pressure values measured by the first and second pressure sensors 38 and 40 are determined to be lower than the predetermined range, it is conceivable that the exhaust gas leaks out of either portion such as the muffler 14 or the exhaust gas introduction passage 48. When the pressure value measured by the first pressure sensor 38 is determined to be higher than the predetermined range, the exhaust filter 22 is regarded as clogging. Further, when the pressure value measured by the second pressure sensor 40 is determined to be higher than the predetermined range, either portion such as the canister 24 or the passage 52 is regarded as clogging.

When the pressure values measured by the first and second pressure sensors 38 and 40 are determined to be out of the predetermined range, a warning light (not shown in the figure) is on (S15). On the other hand, when the pressure values measured by the first and second pressure sensors 38 and 40 are determined to be within the predetermined range, cranking is stopped after the required number of times of cranking (S16), and then the throttle valve is closed (S17). As mentioned above, the engine system 1 is controlled.

Cranking is stopped after the engine 12 is cranked the required number of times in S16, but the timing of stop of cranking is not limited to this. For example, cranking may be stopped when the second $O_2$ sensor 28 detects that the fresh air (atmosphere) flows in the muffler 14.

The control operation of the engine system 1 according to the present embodiment may be conducted, for example, when the engine 12 is stopped for refueling and a sensor or the like (not shown) detects that a fuel cap (not shown) is opened and closed. Alternatively, the control operation of the engine system 1 according to the present embodiment may be conducted, for example, when a sensor or the like (not shown) detects that the fuel in the fuel tank 10 decreases by a predetermined amount and the engine 12 is stopped.

As above, the engine system 1 effectively utilizes the space in the muffler 14. Namely, the exhaust gas with low oxygen concentration is temporarily stored in the muffler 14 after the engine 12 is stopped, and then the exhaust gas is cooled down to or lower than the predetermined temperature. Then, the engine 12 is forcibly cranked by the MG 18 in a state that all the check valves are opened so that the exhaust gas stored inside the muffler 14 is pushed into the exhaust gas introduction passage 48, allowing the exhaust gas to be introduced in the fuel tank 10 after passing through the exhaust filter 22. The exhaust gas introduced in the fuel tank 10 replaces all or a part of the atmosphere (air) of the vapor phase portion in the fuel tank 10. The exhaust gas introduced into the fuel tank 10 has an oxygen concentration controlled by the second $O_2$ sensor 28 and thus reliably acts as inert gas. Thereby, deterioration of the fuel inside the fuel tank 10 is restrained. Further, occurrence of vapor inside the fuel tank 10 is restrained since the cooled exhaust gas is introduced in the fuel tank 10.

The heretofore existing muffler 14 is used to provide the space for storing and cooling the exhaust gas. Thereby, additional components for storing and cooling the exhaust gas are not necessary. Further, the heretofore existing MG 18 and starter are used as power for cranking. In other words, the engine 12 and the MG 18 function in combination as a pump. In this way, by utilizing the existing components, extra components to be added can be minimized. Accordingly, cost reduction can be achieved.

Figure 4:
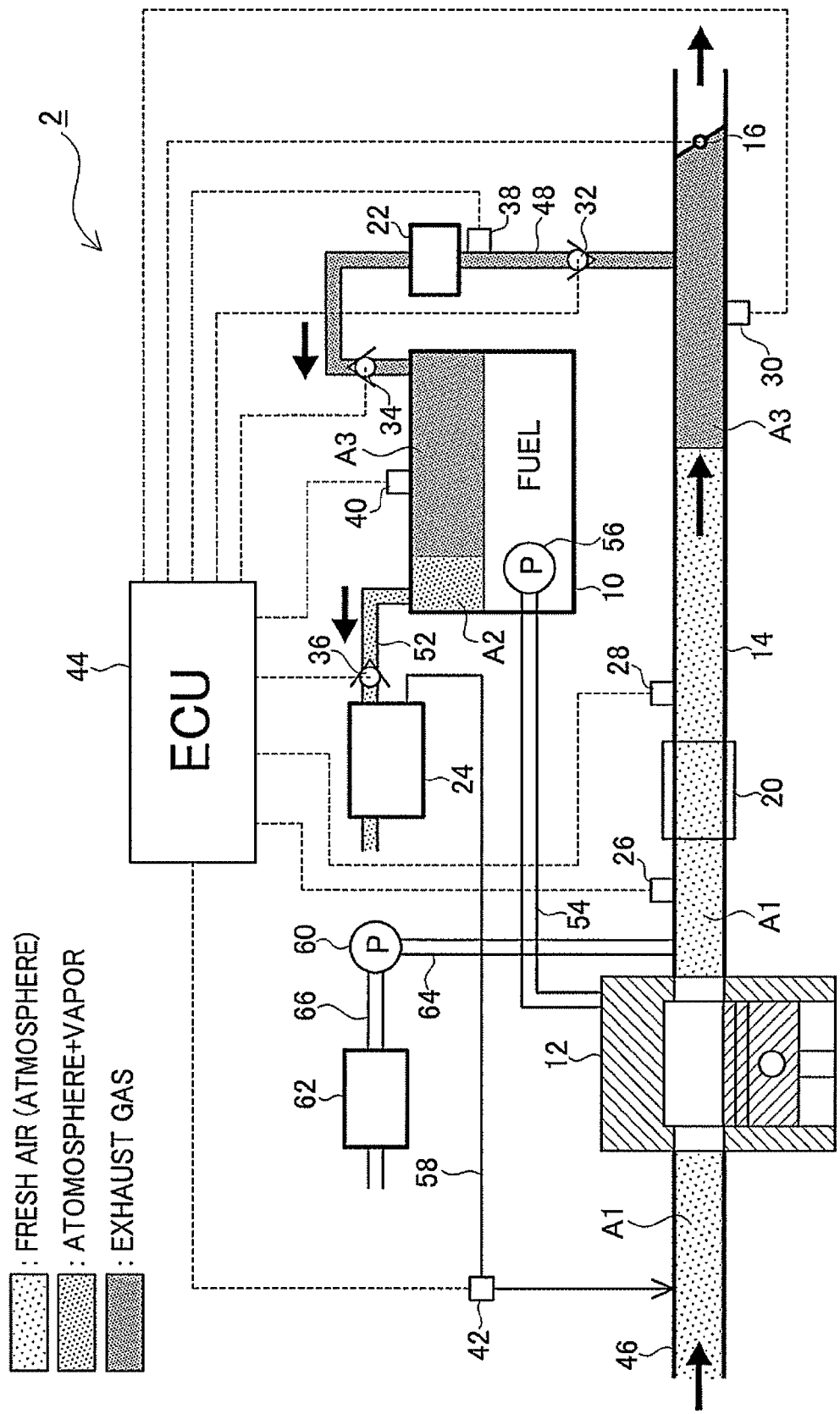
FIG. 4 is a diagram showing an internal combustion engine system after an engine is stopped in a modified example.

As a modified example, an internal combustion engine system 2 shown in FIG. 4 may be adopted. As shown in FIG. 4, the internal combustion engine system 2 includes a secondary air supply device called AI (air injection) system including a pump 60, an air cleaner 62, and a passage 64. The passage 64 is connected to the muffler 14 between the engine 12 and the catalytic converter 20, and more specifically, between the engine 12 and the first $O_2$ sensor 26. The pump 60 and the air cleaner 62 are provided in this order from the muffler 14 side in the passage 64. In this manner, the pump 60 is connected to the muffler 14 between the engine 12 and the catalytic converter 20.

The internal combustion engine system 2 having the above configuration is controlled by the ECU 44 such that, when the engine 12 is stopped, the pump 60 is driven for a predetermined time instead of cranking the engine 12 by the MG 18 so as to introduce the fresh air (atmosphere) cleaned up by the air cleaner 62 in the muffler 14 via the passage 64. Thereby, the exhaust gas stored in the muffler 14 is introduced in the fuel tank 10 via the exhaust gas introduction passage 48.

<Effects of the Present Embodiment>

According to the present embodiment, the ECU 44 controls the exhaust shutter 16 to close the muffler 14 to store the exhaust gas in the muffler 14 after the engine 12 is stopped, and then introduce the exhaust gas stored in the muffler 14 into the fuel tank 10 via the exhaust gas introduction passage 48. Namely, the inert exhaust gas with low oxygen concentration is introduced in the fuel tank 10, so that deterioration (oxidation) of the fuel can be restrained even if the fuel is stored in the fuel tank 10 for a long period. Further, since the exhaust gas stored in the muffler 14 is introduced in the fuel tank 10, an extra tank and others for storing the exhaust gas is not necessary. Furthermore, the exhaust gas is cooled down in the muffler 14, so that there is no need to provide a device for cooling the exhaust gas. Accordingly, deterioration of the fuel in the fuel tank 10 can be restrained as well as achieving cost reduction.

The ECU 44 controls the timing of introducing the exhaust gas in the fuel tank 10 based on the temperature of the exhaust gas stored in the muffler 14 detected by the exhaust temperature sensor 30. Thereby, the exhaust gas can be introduced in the fuel tank 10 after the temperature of the exhaust gas is reliably cooled down. Accordingly, occurrence of vapor in the fuel tank 10 can be restrained.

Further, the engine 12 being stopped is forced to crank so as to introduce atmosphere (air) in the muffler 14, thereby introducing the exhaust gas stored in the muffler 14 into the fuel tank 10 via the exhaust gas introduction passage 48. Therefore, there is no need to provide a component such as a pump for introducing the atmosphere in the muffler 14. Accordingly, further cost reduction can be achieved.

Further, the atmosphere is introduced in an exhaust manifold (not shown) provided on an upstream side (on the engine 12 side) of the muffler 14, and thereby catalysis of unburned gas is promoted by the catalytic converter 20 at a next cold start, improving the cleaning property of the exhaust gas and reducing the amount of HC exhaust (the exhaust amount of hydrocarbon discharged out of a vehicle). The cold start means the timing when the engine 12 is started in a low temperature state in which a temperature of cooling water is below a predetermined value, for example.

The exhaust gas stored in the muffler 14 may be introduced in the fuel tank 10 by use of the existing pump 60 of the AI system. Thereby, there is no need to provide an extra pump for introducing the atmosphere in the muffler 14. Accordingly, further cost reduction can be achieved. Also when the exhaust gas stored in the muffler 14 is introduced in the fuel tank 10 by use of the existing pump 60 of the AI system, the catalysis of the unburned gas is promoted by the catalytic converter 20 at the next cold start, so that cleaning property of the exhaust gas is improved and the HC exhaust amount can be reduced.

The above embodiments are only examples of the present invention, not limiting any feature of the invention. The present invention may be embodied in other improvements and modifications without departing from the essential characteristics thereof.

The present invention does not require a device for cooling the exhaust gas, but for example, the invention is applicable to a system provided with a device for cooling the exhaust gas such as a exhaust heat collecting device as disclosed in JP2007-303425A.

REFERENCE SINGS LIST

1 Internal combustion engine system
10 Fuel tank
12 Engine
14 Muffler
16 Exhaust shutter
18 MG
20 Catalytic converter
26 First $O_2$ sensor
28 Second $O_2$ sensor
30 Exhaust temperature sensor
32 First check valve
34 Second check valve
38 First pressure sensor
40 Second pressure sensor
44 ECU
48 Exhaust gas introduction passage
56 Pump
58 Purge passage
60 Pump
64 Passage

The invention claimed is:

1. An internal combustion engine system comprising:
   a fuel tank for storing fuel to be supplied to an engine and an exhaust passage in which exhaust gas is to be exhausted from the engine;
   a valve configured to close the exhaust passage;
   an exhaust gas introduction passage connecting the exhaust passage and the fuel tank; and
   a controller configured to close the exhaust passage by the valve after the engine is stopped to store the exhaust gas in the exhaust passage and to introduce the exhaust gas stored in the exhaust passage into the fuel tank via the exhaust gas introduction passage.

2. The internal combustion engine system according to claim 1, further including an exhaust temperature sensor for detecting a temperature of the exhaust gas, wherein the controller is further configured to control timing to introduce the exhaust gas in the fuel tank based on the temperature of the exhaust gas stored in the exhaust passage detected by the exhaust temperature sensor.

3. The internal combustion engine system according to claim 2, wherein the controller is further configured to control the engine to crank without starting to introduce atmosphere in the exhaust passage to cause the exhaust gas stored in the exhaust passage to be introduced in the fuel tank via the exhaust gas introduction passage.

4. The internal combustion engine system according to claim 2, further including:
   a catalytic converter to clean up the exhaust gas; and
   a pump connected between the engine and the catalytic converter in the exhaust passage, and the controller is further configured to control the pump to be driven to introduce atmosphere in the exhaust passage to cause the exhaust gas stored in the exhaust passage to be introduced in the fuel tank via the exhaust gas introduction passage.

5. The internal combustion engine system according to claim 1, wherein the controller is further configured to control the engine to crank without starting to introduce atmosphere in the exhaust passage to cause the exhaust gas stored in the exhaust passage to be introduced in the fuel tank via the exhaust gas introduction passage.

6. The internal combustion engine system according to claim 1, further including:
   a catalytic converter for cleaning up the exhaust gas; and
   a pump connected between the engine and the catalytic converter in the exhaust passage, and the controller is further configured to control the pump to be driven to introduce atmosphere in the exhaust passage to cause the exhaust gas stored in the exhaust passage to be introduced in the fuel tank via the exhaust gas introduction passage.

7. A method for controlling an internal combustion engine system, the engine system including a fuel tank for storing fuel to be supplied to an engine and an exhaust passage to which exhaust gas is exhausted from the engine, the internal combustion engine system including (i) a valve configured to close the exhaust passage and (ii) an exhaust gas introduction passage connecting the exhaust passage and the fuel tank, the method comprising:
   closing the exhaust passage with the valve to store the exhaust gas in the exhaust passage after the engine is stopped; and
   introducing the exhaust gas stored in the exhaust passage into the fuel tank after closing the exhaust passage.

* * * * *